United States Patent
Shades

[11] Patent Number: 5,958,252
[45] Date of Patent: Sep. 28, 1999

[54] WASTE TREATMENT DEVICE AND METHOD EMPLOYING THE SAME

[75] Inventor: R. C. Shades, Laguna Hills, Calif.

[73] Assignee: MicroSepTic, Inc., Laguna Hills, Calif.

[21] Appl. No.: 08/901,295

[22] Filed: Jul. 5, 1997

[51] Int. Cl.⁶ .............................. C02F 1/02; C02F 1/30; C02F 9/00

[52] U.S. Cl. ............... 210/748; 95/258; 95/259; 96/219; 110/216; 110/341; 137/571; 210/180; 210/257.1; 210/259; 210/774; 210/806

[58] Field of Search ............ 210/108, 167, 210/173, 175, 180, 181, 194, 195.1, 257.1, 259, 411, 748, 774, 805, 806, 184, 248; 95/258, 259; 96/155, 219; 110/203, 216, 341, 346; 4/111.1, 111.5; 137/393, 571

[56] References Cited

U.S. PATENT DOCUMENTS

| | | | |
|---|---|---|---|
| 3,733,617 | 5/1973 | Bennett | 210/173 |
| 3,762,549 | 10/1973 | Crampton | 210/180 |
| 4,631,133 | 12/1986 | Axelrod | 210/739 |
| 4,718,358 | 1/1988 | Nomi et al. | 110/346 |
| 4,720,972 | 1/1988 | Rao et al. | 60/274 |
| 4,937,411 | 6/1990 | Suzuki et al. | 219/10.55 R |
| 5,106,493 | 4/1992 | McIntosh | 210/108 |
| 5,145,576 | 9/1992 | Lataillade | 210/180 |
| 5,229,010 | 7/1993 | Fluchel | 210/748 |
| 5,276,924 | 1/1994 | Hachima | 4/111.1 |
| 5,290,438 | 3/1994 | Wilkins | 210/177 |
| 5,447,630 | 9/1995 | Rummler | 210/186 |
| 5,454,953 | 10/1995 | Waibel | 210/664 |
| 5,462,676 | 10/1995 | Pitts | 210/774 |
| 5,492,621 | 2/1996 | Curtis | 210/180 |
| 5,547,582 | 8/1996 | Waibel | 210/664 |
| 5,725,762 | 3/1998 | Beal et al. | 210/181 |
| 5,843,304 | 12/1998 | Marchesseault et al. | 210/180 |
| 5,853,579 | 12/1998 | Rummler et al. | 210/180 |

Primary Examiner—Joseph W. Drodge
Attorney, Agent, or Firm—R William Graham

[57] ABSTRACT

A waste treatment device includes a waste holding tank for receiving waste, a solids-gas processor operably connected to the waste holding tank, an aqueous holding tank operably connected to the processor and the waste holding tank and an aqueous purification device operably connected to the aqueous holding tank.

18 Claims, 2 Drawing Sheets

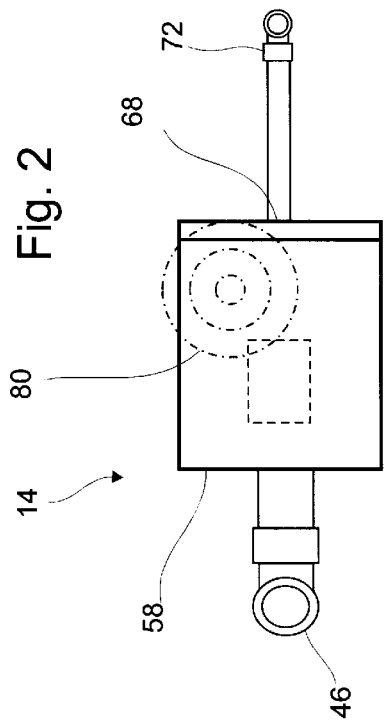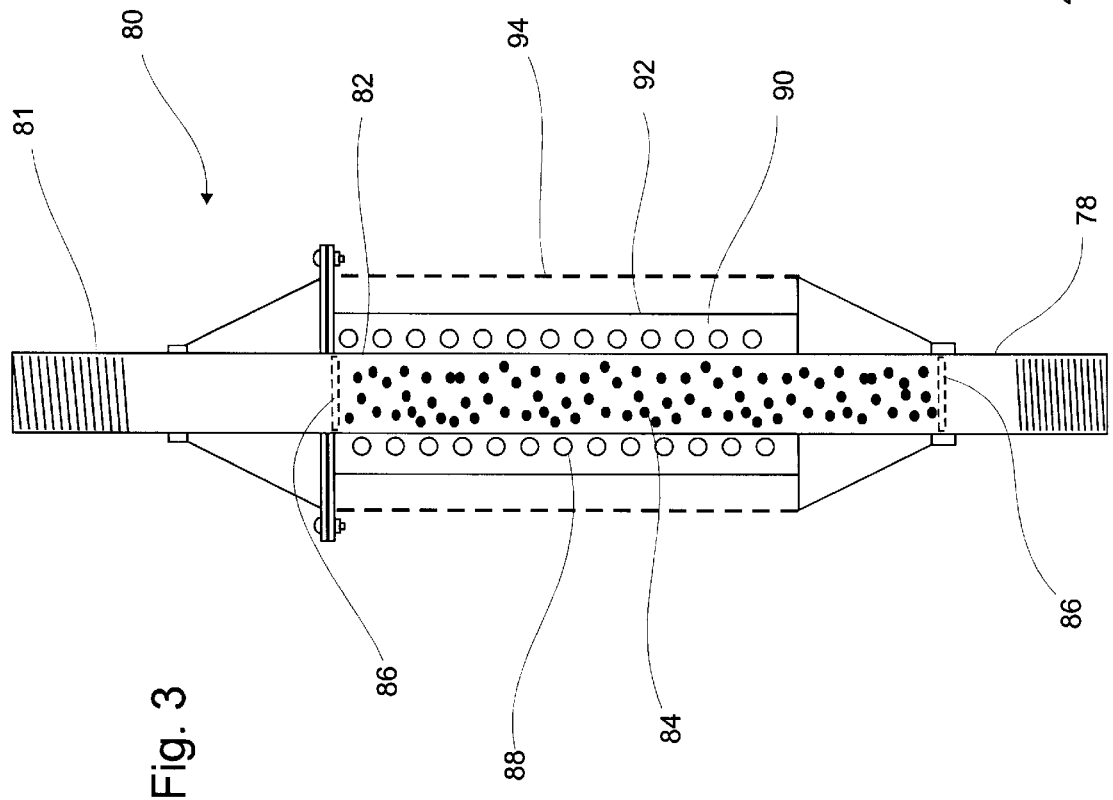

WASTE TREATMENT DEVICE AND METHOD EMPLOYING THE SAME

BACKGROUND OF THE INVENTION

1. Field of the Invention

The present invention relates to a device and method for treating human waste. More particularly, the present invention is directed to a device and method which treat human sewage by way of incineration and purification.

2. Related Art

There exist several devices for treating human sewage. Most commonly are the governmental treatment facilities which exist in urban areas. These facilities are expensive and limited in the capacity of service which they can provide. Accordingly, residential and business development is limited as a function of capacity.

Attempts at solving this problem have resulted in the use of storage tanks (septic tanks and cesspools) which temporarily house the waste for subsequent removal and remote treatment. Other systems attempt on-site treatment of human waste. Some of these devices have employed microwaves in an incineration process of solids. Other devices employ filters in the purification process of fluids.

A goal of these devices is to treat the waste in a manner to make the resultant matter environmentally acceptable and substantially free of contaminants. One problem is that these devices fail to adequately treat the waste in a manner to provide total environmental disposability and/or reusability. Another problem exists in that the gases which result as a biproduct of the incineration process are noxious and environmentally unfriendly.

There remains a need to improve the devices which exist for treatment of human waste. There also remains a need for a relatively inexpensive means to accomplish the above goal and overcome the aforesaid problems. The present invention sets forth a device and method which meet these needs.

BRIEF SUMMARY OF THE INVENTION

It is an object to improve human waste disposal.

It is another object to treat disposal of human waste in a more environmentally acceptable manner.

It is still another object to improve the device for treating disposal of human waste in a more environmentally acceptable manner.

Accordingly, the present invention is directed to a waste treatment device. The device includes a waste holding tank for receiving waste, a solids-gas processor operably connected to the waste holding tank, an aqueous holding tank operably connected to the processor and the waste holding tank and an aqueous purification device operably connected to the aqueous holding tank. The processor includes means for microwaving waste and means for catalytically heat treating gas generated from the processing tank in a manner to place the gas in an environmentally friendly condition to be received into the environment. The aqueous purification device includes means for filtering aqueous solution received from at least one of the holding tank and the processor and means for ridding free radicals in the aqueous solution.

A method for treating human waste which includes both solids and liquids is also provided. The method includes the steps of feeding the waste into an incineration chamber, elevating temperature of the waste to cause combustion thereof resulting in a gaseous biproduct and an aqueous biproduct, catalytically heat treating the gaseous biproduct to substantially remove contaminants therefrom, and purifying the aqueous biproduct to provide resultant clean water.

Other objects and advantages will be readily apparent to those skilled in the art upon viewing the drawings and reading the detailed description hereafter.

BRIEF DESCRIPTION OF THE DRAWINGS

FIG. 2 is an elevational view of a part of the present invention.

FIG. 3 is a top sectional view of a part of the present invention.

DETAILED DESCRIPTION OF THE INVENTION

Figure 1:
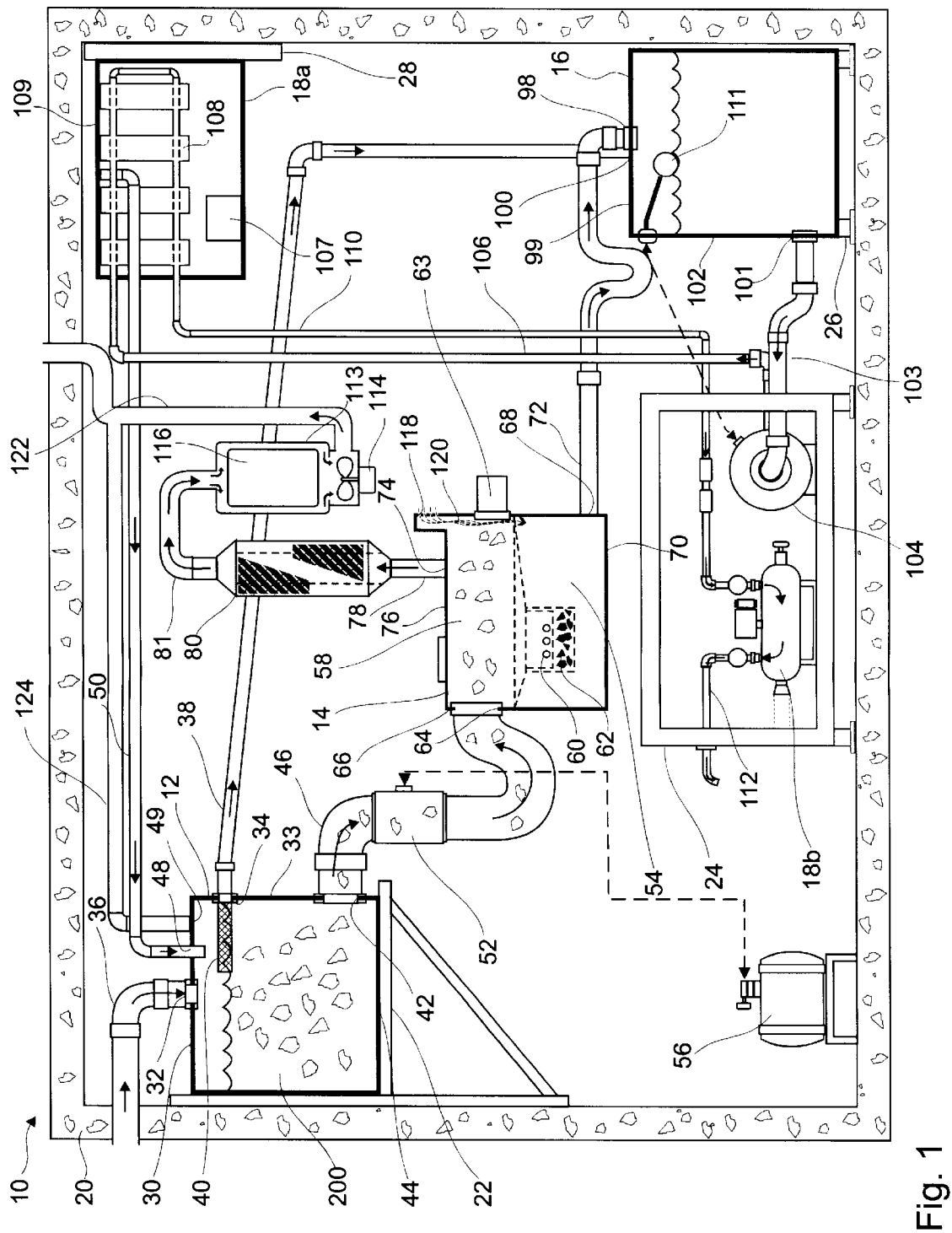
FIG. 1 is an elevational schematic view of the present invention.

Referring now to the drawings, a waste treatment device of the present invention is generally designated by the numeral 10. The waste treatment device 10 generally includes a waste holding tank 12 for receiving mixed solid and aqueous waste 200, a solids-gas processor 14 operably connected to the waste holding tank 12, an aqueous holding tank 16 operably connected to the processor 14 and the waste holding tank 12 and an aqueous purification device 18a and 18b operably connected to the aqueous holding tank 16. The waste treatment device 10 is preferably housed in a subterranean structure 20 preferably made of fiberglass or a like suitable material.

More particularly, the structure 20 is generally rectangular and has connected thereto a plurality of support structures 22, 24, 26 and 28. Support structure 22 supportively connects the waste holding tank 12. Support structure 24 supportively connects both the processor 14 and purification device 18b. The support structure 26 supportively connects the aqueous holding tank 16 and structure 28 supportively connects purification device 18a.

The waste holding tank 12 includes a sealable lid 30 having an open surface 32. A sewage inlet conduit 36 sealingly connects to the open surface 32 in a manner to permit fluid communication from the sewage inlet conduit 36 to waste holding tank 12.

A side 33 of the waste holding tank 12 has an open surface 34, wherein the open surface 34 is adjacent the lid 30. An overflow conduit 38 sealingly connects to the open surface 34 in a manner to permit fluid communication from the waste holding tank 12 to the overflow conduit 38. A solids retention screen 40 is operatively connected adjacent the open surface 34 in a manner to block solids from passing into the overflow conduit 38. Also, the side 33 has another open surface 42 adjacent a bottom 44 of the waste holding tank 12. An outflow conduit 46 sealingly connects to the open surface 42 in a manner to permit waste 200 to flow from the waste holding tank 12 to the outflow conduit 46. Another open surface 48 formed in the lid 30 to which an end of a backflow conduit 50 is sealingly connected and an open surface 49 is formed in the lid 30 to which a vent line 124 connects.

Operatively disposed in the outflow conduit 46 is a pneumatic control valve 52 which is operatively connected to a compressor 54 and which can be either controlled by a computer-based system or a timer either of which is connected to power supply. Within the processor 14 is an incineration chamber 58 which includes a burner coils 60 and lava rock 62 disposed adjacent thereto. A microwave device 63 which includes a magnatron mica shield, magnatron blower and transformer is operatively connected to the incineration chamber 58. The incineration chamber 58 can likewise be either controlled by a computer-based system or a timer either of which is connected to power supply.

An open surface 64 is defined within an upper side 66 of the incineration chamber 58. Another end of the outflow conduit 46 sealingly connects to the open surface 64 in a manner to permit waste to flow from the outflow conduit 46 to the incineration chamber 58. An open surface 68 is defined adjacent the bottom 70 of the incineration chamber 58 to which one end of a conduit 72 seatingly connects to permit fluid flow thereto.

A vented portion 118 is provided in the incineration chamber 58 to permit air intake 120. The vented portion is adjacent and above the microwave device 63 and is of a size and shape to effectively control the amount of combustion air which is required in the incineration process. Also, this permits air flow continuously past the mica shield (window) which protects the magnatron by providing a cleaning action . The vented portion 118 also creates a slight vacuum during the processing which draws against other interfaces such of the chamber 58 to eliminate leakage of steam and smoke.

Another open surface 74 is defined in a top 76 of the incineration chamber 58. An end of an exhaust pipe 78 sealingly connects the open surface 74. Another end of the exhaust pipe 78 sealingly connects to a one end of a catalytic converter 80 part of the processor 14, the particulars of which are best seen in FIG. 3. Another end of the catalytic converter 80 connects to a conduit 81 which in turn connects to a generally cylindrical annular heat exchanger 113.

The heat exchanger 113 has an air pocket 116 in its central region about which cleaned air from the catalytic converter 80 move. The heat exchanger 113 includes a power driven fan 114 to draw the cleaned air therethrough. An exhaust conduit 122 connects to another end of the heat exchanger 113 and extends outside the structure 20 to vent above ground. The vent line 124 connects to the exhaust conduit 122 prior to exiting the structure 20.

The catalytic converter 80 includes a generally annular chamber 82 which has operatively disposed therein a plurality of catalytic conversion particles or pellets 84 which are retained by retention screens 86. The chamber 82 is preferably stainless steel and the pellets 84 are preferably platinum coaled and found to be highly suitable for removing contaminants from gases passing therethrough. Operatively disposed in an encircling manner about the chamber 82 is an electrical heating coil 88 which is operatively connected to the electrical supply and controller. A generally annular heat conductive sleeve 90, preferably made of ceramic fiber, substantially encases the coil 88 and chamber 82. A retaining jacket 92, preferably made of stainless steel, houses the sleeve 90, coil 88, chamber 82 pellets 84 and screens 86. A generally annular shaped heat shield 94, preferably made of a perforated stainless steel, is of a size and configuration to substantially extend about the retaining jacket 92 in an interconnected manner such that the shield 94 is annularly spaced from the retaining jacket 92. in this way cool air circulation is permitted about and between the retaining jacket 92 and the shield 94.

As previously described, the end of the exhaust pipe 78 connects to the catalytic converter 80. Particularly, the exhaust pipe 78 connects to one end of the chamber 82 such that contaminated gases emanating from the incineration chamber 58 can be decontaminated as passed therethrough. In this regard, it has been found that preheating the platinum coated pellets 84 to a predetermined temperature of between about 700° and 1200° Fahrenheit provides enhanced performnance not heretofore known which places air back into the environment and which been substantially decontaminated.

The aqueous holding tank 16 has an open surface 98 in its top side 99 to which another end of the conduit 72 is sealingly connected in a manner to permit fluid flow into the aqueous holding tank 16. Another open surface 100 is defined in the top side 99 to which another end of the overflow conduit 38 is sealingly connected in a manner to permit fluid flow into the aqueous holding tank 16. Another open surface 101 is defined in a lower part of side 102 to which an end of conduit 103 is sealingly connected in a manner to permit fluid flow from the aqueous tank 16.

A float 111 is operably connected, i.e., electrically or mechanically, to a pump 102. Another end of the conduit 102 is sealingly connected to an inlet of a pump 104. Pump 104 is operatively connected to an electrical supply and triggered by the float 111 reaching a predetermined height. An end of conduit 106 is sealingly connected to an outlet of pump 104. Another end of conduit 106 is sealingly connected to an inlet of purification device 18a. The purification device 18a includes a control panel 107, a backwash filter system 109 and a plurality of carbon filters 108 which are arranged in series so that the incoming fluid sequentially travels through the filters 10. Another end of backflow conduit 50 is sealingly connected to the purification device 18a in a manner to permit suspended aqueous/solids to flow back to the waste holding tank 12.

An end of a return conduit 110 is sealingly connected to the purification device 18a in a manner to permit filtered fluid flow therefrom. Another end of a return conduit 110 is sealingly connected to the purification device 18b in a manner to permit filtered fluid flow therethrough. The purification device 18b is a UV light treatment device which rids the filtered water of remaining contaminants, such as free radicals. Another outflow line 112 is sealingly connected to the purification device 18b in a manner to permit irradiated filtered fluid (substantially clean water) to flow from the purification device 18b.

In operation, the waste 200 includes both solids and liquids and is gravity fed to the waste tank 12. The waste 200 is controllably fed into the incineration chamber 58 wherein the heating coils 60, lava rock 62 and microwave device 63 are employed to sufficiently elevate the temperature of the waste to cause combustion thereof Gaseous biproducts are catalytically heat treated to remove contaminants using the catalytic converter 80. Aqueous biproducts are purified by way of filtration and irradiation to provide resultant clean water using the filters 108 and the UV light treatment device 18b.

The above described embodiment is set forth by way of example and is not for the purpose of limiting the present invention. it will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A waste treatment device for treatment of human waste which includes solid waste and aqueous fluid waste, which includes:

a solids and aqueous fluids waste holding tank for receiving the human waste;

a solids-gas processor operably connected to said solids and aqueous fluids waste holding tank and including means for combustion of the human waste to substantially form a gaseous biproduct and an aqueous fluid biproduct, wherein said gaseous biproduct is substantially cleaned by said solids-gas processor;

an aqueous waste holding tank operably connected to said solids-gas processor and said solids and aqueous fluids waste holding tank in a manner to receive aqueous fluids directly and separately therefrom; and an aqueous purification device operably connected to said aqueous waste holding tank having means for purifying said aqueous fluids to render a resultant substantially contaminant free water.

2. The waste treatment device of claim 1, which further includes means for controllably feeding waste from said solids and aqueous waste holding tank to said solids-gas processor.

3. The waste treatment device of claim 1, wherein said combustion means includes a combustion chamber having a heating coil operably disposed therein with heat conductive elements operably disposed adjacent said heating coil and further includes means for producing microwaves within said combustion chamber.

4. The waste treatment device of claim 1, wherein said processor includes a catalytic converter having platinum coated pellets therein and means for heating said pellets operably connected thereto for treating said gaseous biproduct to render a resultant substantially contaminant free air.

5. The waste treatment device of claim 4, wherein said solids-gas processor processor includes a heat exchanger operably connected downstream to said catalytic converter for cooling said resultant substantially contaminant free air.

6. The waste treatment device of claim 1, wherein said aqueous purification device includes at least one carbon filtering device for receiving said aqueous fluid therethrough to aid in ridding said aqueous fluid of contaminants.

7. The waste treatment device of claim 6, wherein said aqueous purification device further includes means operably connected to said aqueous waste holding tank for irradiating said aqueous fluid to substantially rid said aqueous fluid free from radical contaminants.

8. The waste treatment device of claim 6, wherein said carbon filtering device includes means for passing a nonfiltrate back to said solids and aqueous fluids waste holding tank.

9. The waste treatment device of claim 6, wherein said aqueous purification device further includes a backwash filter.

10. The waste treatment device of claim 1, wherein said aqueous purification device includes means operably connected to said aqueous waste holding tank for irradiating said aqueous fluids to substantially rid said aqueous fluids free from radical contaminants.

11. A method for treating human waste which includes both solids and liquids, which include the steps of:
(a) feeding solids and aqueous fluids waste into a solids and aqueous fluids waste holding tank;
(b) feeding said waste into an incineration chamber;
(c) elevating temperature of said waste to cause combustion thereof resulting in a gaseous biproduct and an aqueous biproduct;
(d) treating said gaseous biproduct to substantially remove contaminants therefrom;
(e) collecting said aqueous biproduct and overflow from said fluids waste holding tank in an aqueous waste holding tank; and
(f) purifying said aqueous biproduct to provide resultant clean water.

12. The method of claim 11, wherein the step (b) is further characterized as controllably feeding said waste.

13. The method of claim 11, wherein the step (e) is further characterized by carrying out said purification by passing said aqueous biproduct through a carbon filter.

14. The method of claim 13, wherein the step (e) is further characterized by carrying out said purification by passing said aqueous biproduct through a backwash filter.

15. The method of claim 11, wherein the step (e) is further characterized by carrying out said purification by irradiating said aqueous biproduct.

16. The method of claim 11, wherein the step (e) is further characterized by carrying out said purification by passing said aqueous biproduct through a carbon filter and by irradiating said aqueous biproduct.

17. The method of claim 16, wherein the step (e) is further characterized by carrying out said purification by passing said aqueous biproduct through a backwash filter.

18. The method of claim 11, wherein the step (d) is further characterized by carrying out said treating by catalytically heat treating said gaseous biproduct using platinum coated pellets.

* * * * *